W. H. HINK.
VEHICLE FENDER.
APPLICATION FILED FEB. 25, 1922.

1,417,321.

Patented May 23, 1922.
2 SHEETS—SHEET 1.

Inventor
William H. Hink
By N. E. Dunlap
Attorney

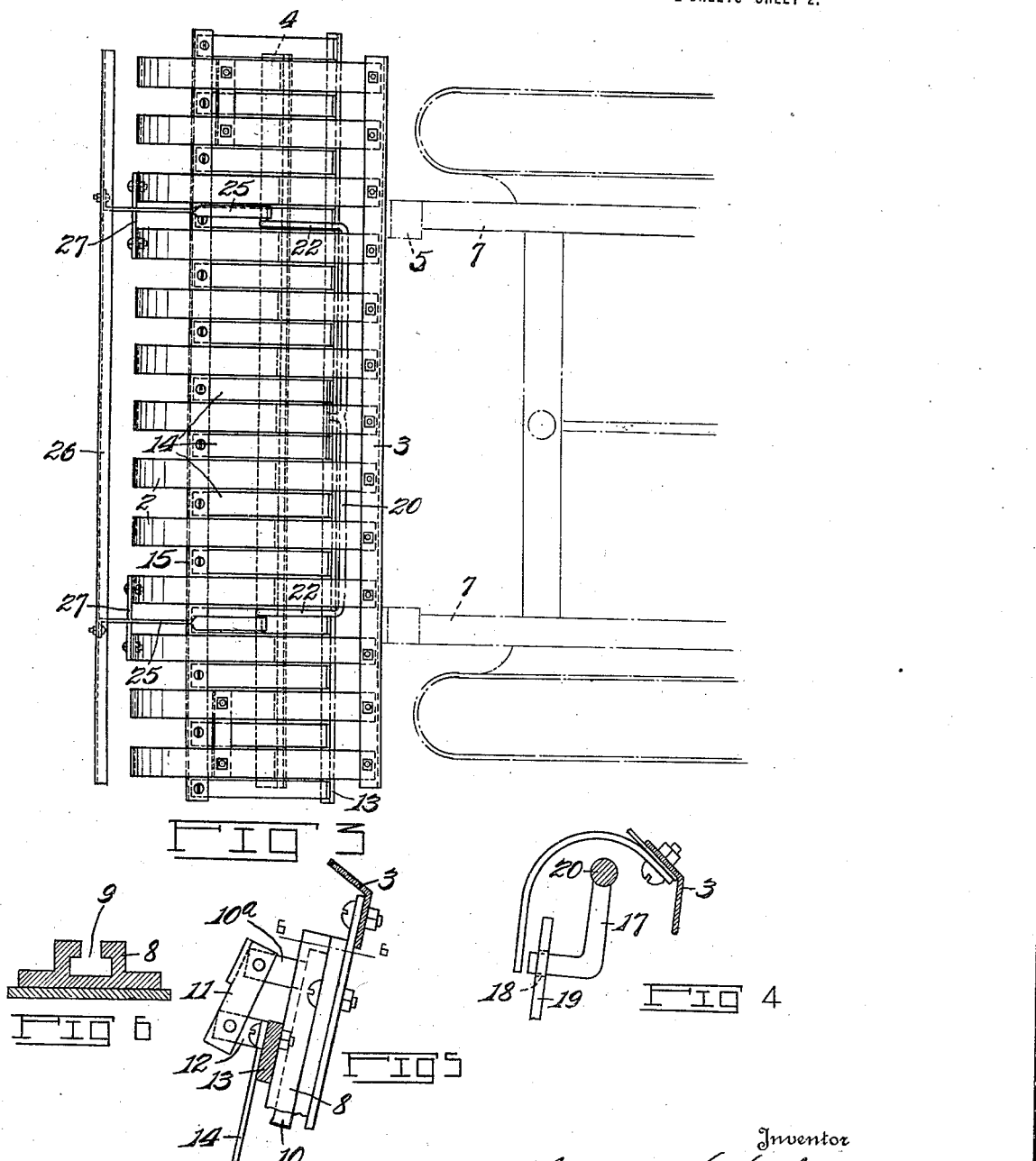

UNITED STATES PATENT OFFICE.

WILLIAM H. HINK, OF WHEELING, WEST VIRGINIA, ASSIGNOR OF ONE-HALF TO J. P. MORNINGSTAR, OF WHEELING, WEST VIRGINIA.

VEHICLE FENDER.

1,417,321.   Specification of Letters Patent.   Patented May 23, 1922.

Application filed February 25, 1922. Serial No. 539,118.

*To all whom it may concern:*

Be it known that I, WILLIAM H. HINK, a citizen of the United States of America, and resident of Wheeling, county of Ohio, and State of West Virginia, have invented certain new and useful Improvements in Vehicle Fenders, of which the following is a specification.

This invention relates broadly to fenders for motor vehicles, and more specifically to a safety fender designed for use on automobiles.

The primary object of the invention is to provide a fender for motor vehicles having a shiftable member or portion which is normally disposed in an upright out-of-the-way position and which is adapted to be automatically tripped and actuated to assume a horizontal position for receiving and carrying thereon a person struck by the moving vehicle.

A further object is to provide a fender of the character mentioned in which the impact thereof with a person in the roadway automatically actuates a carrier portion of the fender to instantly move to a forwardly thrust lowered position in which it is adapted to catch and support such person, preventing the infliction of serious injury.

In describing the invention in detail, reference is herein had to the accompanying drawings, in which—

Figure 3 is a top plan view;

Figure 4 is an enlarged detail section on line 4—4, Fig. 2, illustrating the supporting mechanism for the carrier frame;

Figure 5 is an enlarged detail section illustrating the connection between a slide-block and the carrier frame; and—

Figure 6 is a cross section of a guide member, taken on line 6—6, Fig. 5.

Figure 1:
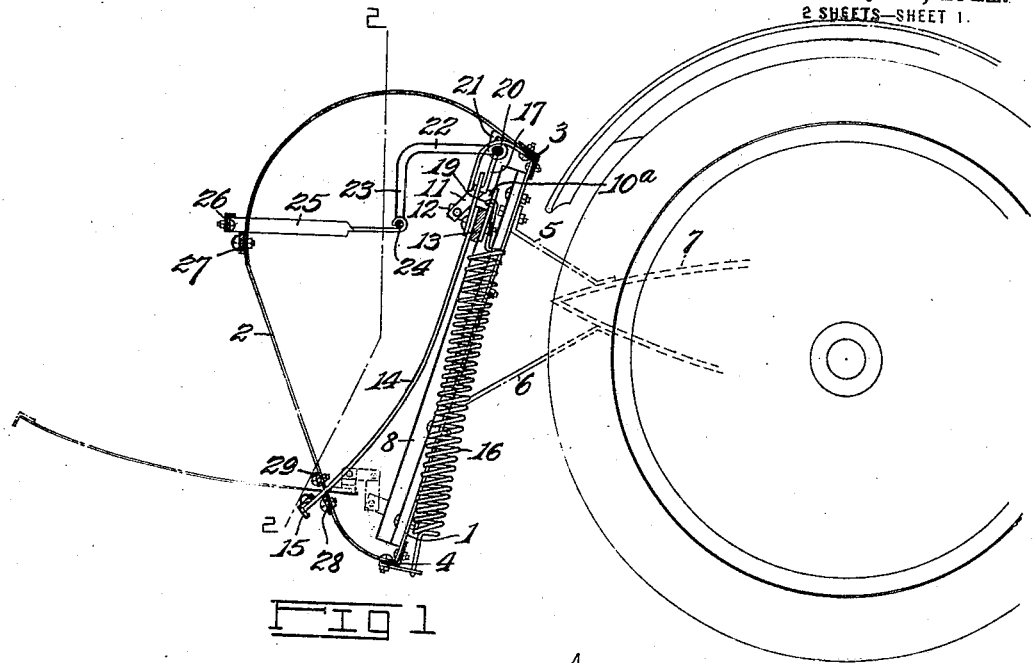
Figure 1 is a vertical section of the invention.
Figure 2:
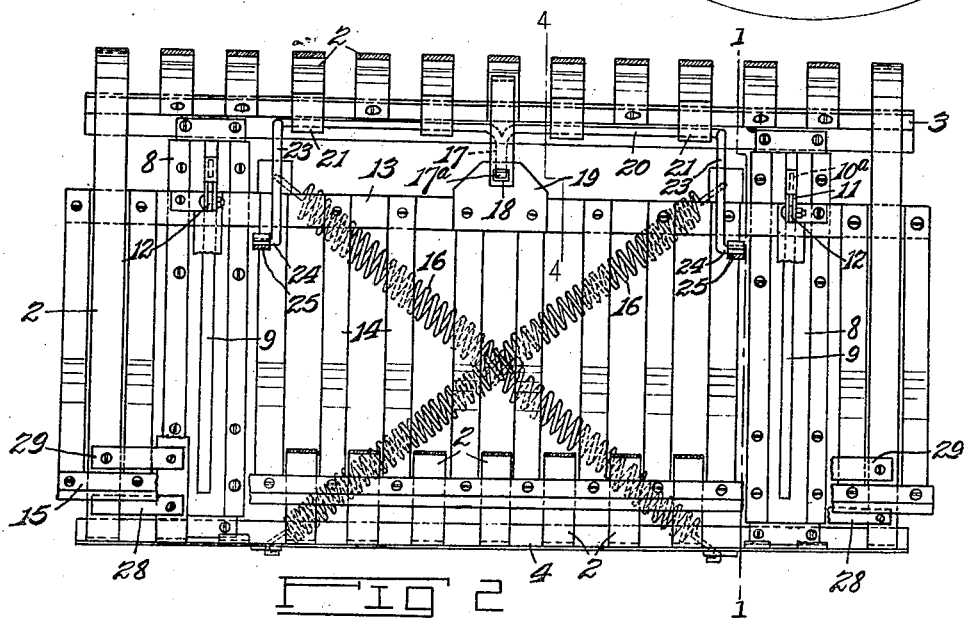
Figure 2 is a sectional elevation of the same, said section being taken substantially on line 2—2, Fig. 1.

Referring to said drawings, 8 indicates each of two parallel members which constitute the opposite sides of an approximately vertical metal frame of rectangular form, said members being rigidly attached at their upper and lower ends, respectively, to upper and lower transverse bars 3 and 4 that constitute complemental members of said frame. Suitable supporting brackets, as 5 and 6 rigidly carried on the rear faces of said side members 8, are adapted to support the frame stationarily, as upon the front end of the frame 7 of an automobile.

Rigidly carried by the upper transverse frame member 3 are the upper ends of a plurality of regularly spaced parallel bars or slats 2 of forwardly bowed form which have their lower ends attached in like manner to the lower frame member 4, said bars constituting guards by which objects colliding therewith are prevented from coming into engagement with the movable parts of the fender mechanism, which will hereinafter be described.

Each of the members 8 of the frame is of channel-like form, having a longitudinal T-shaped channel 9 in its face constituting a guideway in which is disposed a slidable block 10 having a projecting tongue 10$^a$. Coupled to said tongue by means of a pivoted link 11 is a short forwardly directed arm 12 fixed upon a transverse bar 13. Said bar constitutes the upper member of a substantially rectangular carrier frame which is normally disposed in an approximately vertical position in front of the main frame and which is adapted to be thrust downward and forward into the substantially horizontal lowered position indicated in dotted lines in Fig. 1.

Said carrier frame comprises said bar 13, a plurality of parallel bars or slats 14 having their upper ends mounted upon said bar 13, and a transverse bar 15 carried by the lower ends of said slats. Said slats 14 have their lower ends projecting forward between the slats 2, and the bar 15 is carried by said slats 14 in front of the slats 2. A plurality of retractile spiral springs 16 have their upper ends suitably attached to the upper end of said carrier frame and their lower ends attached to the lower part of the stationary frame, said springs being maintained under considerable tension when the carrier frame occupies its elevated position.

Said carrier frame is supported in its elevated position against the tension of the springs 16 by suitable mechanism, the mechanism herein shown being of a trigger-like character and comprising a depending hook 17 engaged with an eye 18 provided in a lug 19 carried centrally of the upper part of the carrier frame. Said hook is carried by an intermediate portion of a rock-shaft 20 which is mounted for rotary movement in bearings 21 carried by the upper transverse bar 3 of the stationary frame. Forwardly directed arms 22 carried by or formed integral with the opposite ends of said rock-shaft have downturned end portions 23 with laterally directed terminals 24, and loosely mounted upon said terminals are the inner ends of rods 25 which extend forward between slats 2 of the stationary frame and which rest upon suitable supports, as cross strips 27 carried by adjacent slats 2. Mounted upon the outer ends of said strips 27 in front of the slats 2 is a transverse buffer bar 26 which, being the most advanced part of the fender structure, is adapted to positively engage the body of a person struck by the fender. The impact of the buffer 26 with such body results in the rods 25 being thrust rearward, and this movement effects, through the arm 22, a slight forward rotary movement of the rock-shaft 20, whereby the hook 17 is swung rearward to a position in which its forwardly directed terminal 17ᵃ is withdrawn from the eye 18 in the lug 19, thus releasing the carrier frame. The frame, so released, is actuated by the springs 16 to instantly assume the lowered approximately horizontal position shown in dotted lines in Fig. 1 in which it is disposed for receiving and carrying thereon the person or object struck, said carrier frame being guided to said position by a plurality of guides each of which consists of a pair of relatively spaced short transverse bars 28 and 29 carried by the slats 8 and between which certain of the slats 14 extend. Further, the lower bar 28 of each of said guides forms a support upon which the carrier frame rests when in its said lowered position.

What is claimed is—

1. In a vehicle fender, a main frame embodying a plurality of approximately vertical guide-members, slide-blocks movable on said guide-members, a carrier frame having pivoted link connection with said slide-blocks, coil springs tending to hold said carrier frame in a lowered substantially horizontal position, means normally holding said carrier frame in an elevated substantially vertical position against the tension of said springs, and a buffer whereby said holding means may be shifted for releasing said carrier frame.

2. In a vehicle fender, a main frame embodying a plurality of approximately vertical guide-members, slide-blocks movable on said guide-members, a carrier frame having its upper part attached to said slide-blocks, coil springs tending to hold said carrier frame in a lowered position in which said blocks are positioned adjacent to the lower ends of said guide-members, means for supporting said carrier frame in elevated position against the tension of said springs, means for releasing said holding means, and means for guiding said carrier frame to a substantially horizontal position during lowering movement thereof and for supporting said frame in said position.

3. In a vehicle fender, a main frame embodying substantially vertical guides, slide-blocks movable along said guides, a carrier frame having pivotal connection with said blocks, springs tending to maintain said carrier frame in a lowered position in which said blocks are located adjacent to the lower ends of said guides, means for supporting said carrier frame in an elevated substantially vertical position against the tension of said springs, means for disengaging said supporting means, and means whereby, when said carrier frame is lowered, it is actuated to move to and is supported in substantially horizontal position.

4. In a vehicle fender, a main frame embodying substantially vertical guides, slide-blocks movable along said guides, a carrier frame having pivotal connection with said blocks, springs tending to maintain said carrier frame in a lowered position in which said blocks are located adjacent to the lower ends of said guides, a rock-shaft having a depending member adapted for engagement with said carrier frame whereby the latter is supported in upright position against the tension of said springs, a buffer adapted to be actuated for moving said rock-shaft to a position in which said depending member is disengaged from said carrier frame, and means for supporting the carrier frame in substantially horizontal position when lowered.

5. In a fender, a main frame of substantially rectangular form, forwardly bowed slat-like members carried by said frame, upright guides carried by said frame, slide-blocks movable along said guides, a carrier frame having its upper portion pivotally connected to said slide-blocks and movable with the latter, said carrier frame in its elevated position being located substantially parallel and adjacent to said main frame and in its lowered position being located at substantially right angles to said main frame, slats carried by said carrier frame and projecting forward between the slat-like members of said main frame, springs tending to maintain said carrier frame in its lowered position, means for supporting said carrier frame in its elevated position against the tension of said springs, a buffer located in front of said slat-like members, and means intermediate said buffer and said supporting means whereby, when the former is thrust rearward, the latter is actuated to release said carrier frame.

In testimony whereof, I affix my signature in presence of two subscribing witnesses.

WILLIAM H. HINK.

Witnesses:
G. O. SMITH,
H. E. DUNLAP.